(12) United States Patent
Nagae et al.

(10) Patent No.: US 8,164,725 B2
(45) Date of Patent: Apr. 24, 2012

(54) LIQUID CRYSTAL DEVICE AND ELECTRONIC APPARATUS

(75) Inventors: Nobukazu Nagae, Suwa (JP); Takeshi Miyashita, Suwa (JP)

(73) Assignee: Seiko Epson Corporation (JP)

( * ) Notice: Subject to any disclaimer, the term of this patent is extended or adjusted under 35 U.S.C. 154(b) by 120 days.

(21) Appl. No.: 12/366,672

(22) Filed: Feb. 6, 2009

(65) Prior Publication Data

US 2009/0237605 A1 Sep. 24, 2009

(30) Foreign Application Priority Data

Mar. 18, 2008 (JP) .................................. 2008-069223

(51) Int. Cl.
*G02F 1/1337* (2006.01)

(52) U.S. Cl. ........ 349/128; 349/129; 349/130; 349/134; 349/136; 428/1.25; 428/1.26

(58) Field of Classification Search .................. None
See application file for complete search history.

(56) References Cited

U.S. PATENT DOCUMENTS

| | | | | |
|---|---|---|---|---|
| 6,097,464 A | * | 8/2000 | Liu ................................ | 349/130 |
| 6,781,656 B2 | * | 8/2004 | Yoshida et al. ............... | 349/124 |
| 6,781,657 B1 | * | 8/2004 | Kim et al. ..................... | 349/129 |
| 7,808,593 B1 | * | 10/2010 | Kim et al. ..................... | 349/129 |
| 2004/0156004 A1 | * | 8/2004 | Shigeta et al. ................ | 349/134 |
| 2004/0246423 A1 | * | 12/2004 | Sasabayashi et al. ......... | 349/130 |
| 2005/0146664 A1 | * | 7/2005 | Hanaoka et al. .............. | 349/130 |
| 2005/0162591 A1 | | 7/2005 | Hashimoto | |
| 2006/0051524 A1 | * | 3/2006 | Gibbons et al. ................ | 428/1.2 |
| 2009/0201454 A1 | * | 8/2009 | Kume et al. ................... | 349/129 |

FOREIGN PATENT DOCUMENTS

| | | |
|---|---|---|
| JP | 10-161127 | 6/1998 |
| JP | 2002-268066 | 9/2002 |
| JP | 2002-296597 | 10/2002 |
| JP | 2005-156717 | 6/2005 |
| JP | 2005-181794 | 7/2005 |
| JP | 2007-155949 | 6/2007 |
| JP | 2008-139540 | 6/2008 |

* cited by examiner

*Primary Examiner* — Thanh-Nhan P. Nguyen
(74) *Attorney, Agent, or Firm* — Harness, Dickey & Pierce, P.L.C.

(57) ABSTRACT

A liquid crystal device includes: a circuit substrate; a counter substrate disposed so as to be opposed to the circuit substrate; a liquid crystal layer interposed between the circuit substrate and the counter substrate, the liquid crystal layer showing vertical alignment as an initial alignment state; a first alignment layer manufactured on a side of the counter substrate using a coating process, the side facing the liquid crystal layer, the first alignment layer having a vertical alignment function; and a second alignment layer manufactured on a side of the circuit substrate using a vacuum process, the side facing the liquid crystal layer, the second alignment layer generating a pretilt.

3 Claims, 4 Drawing Sheets

LIQUID CRYSTAL DEVICE AND ELECTRONIC APPARATUS

CROSS-REFERENCE TO RELATED APPLICATION

This application is based on and claims priority from Japanese Patent Application No. 2008-069223, filed on Mar. 18, 2008, the contents of which are incorporated herein by reference.

BACKGROUND

1. Technical Field

The present invention relates to a liquid crystal device and an electronic apparatus.

2. Related Art

In recent years, the vertical alignment mode has been adopted as the mode of aligning liquid crystal in a liquid crystal device for use in a projector. However, since liquid crystal molecules are aligned vertically to surfaces of substrates in the vertical alignment mode, interactions between the liquid crystal molecules are weak in the azimuth direction in which the liquid crystal molecules are tilted when applying a voltage. Accordingly, when applying a voltage, the liquid crystal molecules are tilted in various directions due to a lateral electric field that occurs from an electrode edge. Also, since some liquid crystal molecules do not contribute to display depending on the azimuth (that is, liquid crystal molecules parallel with the transmission axis of any one of polarizing plates under the crossed nicols condition do not make a phase difference), there occurs a problem that the transmittance becomes lower than that in parallel alignment.

In order to prevent a lateral electric field from affecting the alignment, a method of making a pretilt angle on a pixel electrode requiring strong alignment control force smaller than that on a counter substrate so as to reduce light leakage has been disclosed in JP-A-10-161127. However, a substantial average tilt angle for preventing a lateral electric field from affecting the alignment is almost the same as a pretilt angle used under mass-production conditions so that little effect for improving the contrast is obtained. Also, alignment layers provided on the opposed surfaces of the two substrates are manufactured by oblique evaporation, and if a liquid crystal device is mass-produced, multiple expensive apparatuses such as vacuum deposition systems are required. Accordingly, a large initial investment must be made.

For this reason, a method of preventing a lateral electric field from causing an alignment failure in TN mode, which is one of the liquid crystal display modes, using a technique of forming an inorganic alignment layer on an active matrix substrate by oblique evaporation and forming an organic alignment layer on a counter substrate using a typical mass-production method such as printing or a coating process, has been disclosed in JP-A-2002-296597.

As for JP-A-2002-296597, it is possible to reduce equipment investment, since an alignment layer is manufactured on a counter substrate using a typical mass-production method such as printing or a coating process. However, it is difficult to tilt liquid crystal molecules from a completely vertical state by performing rubbing on polyimide for vertical alignment that can be used as a coating. For this reason, in direct-view medium and small-size liquid crystal devices and large-size liquid crystal devices, the azimuth in which liquid crystal molecules are tilted when a voltage is applied is determined using a lateral electric field caused around an edge of each pixel electrode or a protrusion (surface shape) provided on a surface of an electrode. As for this method, a disclination attributable to competition between liquid crystal molecules almost always occurs in each pixel; however, such a disclination is not remarkable, since the size of each pixel is several tens of micron meter. Nevertheless, a liquid crystal panel, such as HTPS (high temperature poly-silicon) or LCOS (liquid crystal on silicon), that is used as a light valve of a projector and whose pixel size is around 10 µm has a problem that a disclination can be visually recognized during projection so that display quality is degraded.

SUMMARY

An advantage of the invention is to provide a liquid crystal device and an electronic apparatus that show a favorable contrast characteristic by preventing occurrence of a display failure such as a disclination and reduce the cost.

A liquid crystal device according to a first aspect of the invention includes: a circuit substrate; a counter substrate disposed so as to be opposed to the circuit substrate; a liquid crystal layer sandwiched between the circuit substrate and the counter substrate, the liquid crystal layer showing vertical alignment as an initial alignment state; a first alignment layer manufactured on a side of the counter substrate using a coating process, the side facing the liquid crystal layer, the first alignment layer having a vertical alignment function; and a second alignment layer manufactured on a side of the circuit substrate using a vacuum deposition process, the side facing the liquid crystal layer, the second alignment layer generating a pretilt.

By adopting the first aspect of the invention, the coating-type (coating process) first alignment layer is provided on the counter substrate of the substrates forming a pair. This do not need for manufacturing alignment layers on the two substrates using a vacuum deposition process (oblique evaporation) when a liquid crystal device is mass-produced, thereby reducing the number of expensive vacuum deposition systems. As a result, initial investment cost is significantly reduced. Also, since the second alignment layer made by the method of an oblique evaporated is provided on the circuit substrate, the alignment direction in which liquid crystal molecules are tilted when applying a voltage is controlled. Consequently, the liquid crystal molecules are tilted in one direction by suppressing the influences of a lateral electric field generated out of the pixel electrode, thereby effectively preventing occurrence of a disclination. As a result, a liquid crystal display having high display quality is manufactured at low cost.

In the liquid crystal device according to the first aspect of the invention, a pretilt angle generated by the second alignment layer is preferably in the range of 81.0° to 86.5°.

By adopting the first aspect of the invention, the pretilt angle is in the range of 81.0° to 86.5°. This prevents a lateral electric field from affecting conflict between the liquid crystal molecules, thereby maintaining a high-contrast characteristic while preventing occurrence of a disclination. If the pretilt angle on the second alignment layer is smaller than 81.0°, the liquid crystal molecules are tilted more than necessary when applying no voltage. This causes a deterioration in contrast. If the pretilt angle on the second alignment layer is larger than 86.5°, it is difficult to control the direction in which the liquid crystal molecules are aligned when applying a voltage.

An electronic apparatus according to a second aspect of the invention includes the liquid crystal device according to the first aspect of the invention.

By adopting the second aspect of the invention, an electronic apparatus having high display quality is manufactured at low cost.

BRIEF DESCRIPTION OF THE DRAWINGS

The invention will be described with reference to the accompanying drawings, wherein like reference numerals designate like elements.

DESCRIPTION OF EXEMPLARY EMBODIMENT

An embodiment of the invention will be described with reference to the accompanying drawings. In order to make the drawings easy to see, the layer thicknesses of the elements, ratios between the sizes of the elements, and the like are changed as appropriate.

Liquid Crystal Device

A liquid crystal device according to this embodiment shown below is an active matrix, transmissive liquid crystal device using thin-film transistor (TFT) elements as switching elements.

Figure 1:
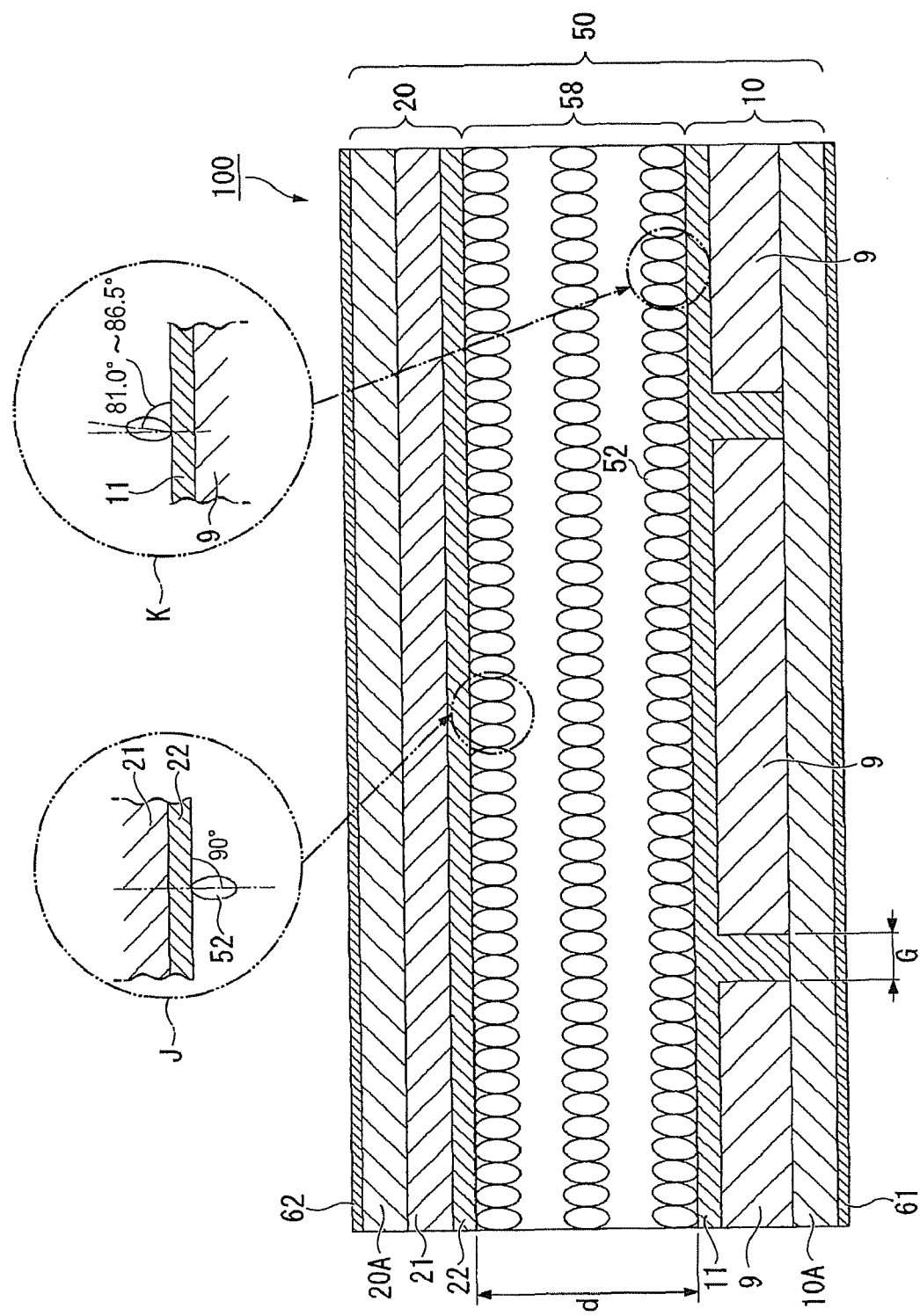
FIG. 1 is a sectional view showing an alignment state of liquid crystal molecules at the time when applying no voltage.

FIG. 1 schematically shows a sectional structure of a liquid crystal device. Specifically, FIG. 1 shows the alignment state of liquid crystal molecules at the time when applying no voltage. Referring to FIG. 1, a sectional structure (pixel structure) of the liquid crystal device according to this embodiment will be described.

In a liquid crystal panel 50, a liquid crystal layer 58 is sandwiched between a circuit substrate 10 and a counter substrate 20 disposed so as to be opposed to the circuit substrate 10. The liquid crystal layer 58 shows vertical alignment as an initial alignment state and is made of a liquid crystal material having negative dielectric anisotropy. In the circuit substrate 10, rectangular pixel electrodes 9 made of a transparent, conductive material such as indium tin oxide (hereafter referred to as "ITO") are formed on the inner surface of a substrate body 10A made of a transparent material such as glass. Also, the circuit substrate 10 includes TFT elements (not shown), which are switching elements for controlling energization of the pixel electrodes 9, data lines (not shown) through which pixel signals are provided, scan lines (not shown), and the like. Also, the circuit substrate 10 has a function of a light-shielding layer in some cases.

In the counter substrate 20, a common electrode 21, which is made of a transparent, conductive layer such as ITO, is formed on the inner surface of a substrate body 20A, which is made of a transparent material such as glass. The common electrode 21 is not divided so as to correspond to each pixel area. That is, the common electrode 21 is formed solidly on the entire inner surface of the substrate body 20A. Also, the common electrode counter substrate 20 includes a color filter, a light-shielding layer, or the like in some cases.

The counter substrate 20 includes a first alignment layer 22 that is formed so as to cover the common electrode 21 and has a vertical alignment function, while the circuit substrate 10 includes a second alignment layer 11 that is formed so as to cover multiple pixel electrodes 9 and has a pretilt function. In the liquid crystal layer 58 sandwiched between the counter substrate 20 and circuit substrate 10 configured as described above, the liquid crystal molecules 52 show vertical alignment as an initial alignment state (state at the time when applying no voltage).

The first alignment layer 22 is an alignment layer that does not have a pretilt angle, and aligns liquid crystal molecules 52, which are located on the interface, substantially vertically to the substrate surface (see J in FIG. 1). The second alignment layer 11 has a function (pretilt) of aligning liquid crystal molecules 52, which are located on the interface, at an angle in the range of 81.0° to 86.5° with respect to the substrate surface (see K in FIG. 1). If the pretilt angle is smaller than 81.0°, the liquid crystal molecules are tilted more than necessary when applying no voltage so that the contrast is reduced. If the pretilt angle is larger than 86.5°, the liquid crystal molecules cannot be aligned in a one-direction when applying a voltage. Accordingly, the above-mentioned range is defined as a critical pretilt angle that does not cause a disclination attributable to conflict between the liquid crystal molecules. This will be described in detail later. The critical pretilt angle varies depending on an inter-pixel electrode gap G, a cell gap d, or the like.

The first alignment layer 22 is obtained by coating the substrate body 20A with an alignment layer material solution, using a coating process such as spin-coating or flexography, and baking the alignment layer material solution.

A material having, as a side chain, a long-chain alkyl group or a functional group having a rigid flat structure is used as the material of the first alignment layer 22. Polyamic acid, which is a precursor of polyamide, or polyimide is preferably used.

For example, it is preferable to use a polymer including polyamic acid having a repeating unit represented by Chemical Formula 1 below and an imidized polymer obtained by partially dewatering and cyclizing the polyamic acid, or a material including an imidized polymer that is obtained by at least partially dewatering and cyclizing polyamic acid having a repeating unit represented by Chemical Formula 2 below and whose imidized ratio is 40% or more.

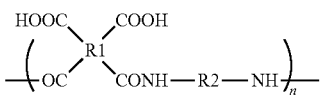

Chemical Formula 1 where R1 is a quadrivalent organic group and R2 is a divalent organic group.

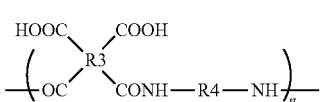

Chemical Formula 2 where R3 is a quadrivalent organic group and R4 is a univalent organic group obtained by adding an alkyl group having 10 to 20 carbon atoms and an alicyclic skelton having 4 to 40 carbon atoms to a divalent cyclic compound.

The second alignment layer 11 is obtained by evaporating an inorganic material onto the substrate body 10A by oblique evaporation.

Silicon oxide such SiO$_2$ or SiO or metal oxide such as Al$_2$O$_3$, ZnO, MgF or ITO is used as the material of the second alignment layer 11.

Polarizing plates 61 and 62 are provided on both sides of the liquid crystal panel 50 in a cross nicol state in such a manner that the polarization axes thereof are approximately orthogonal to each other. A light source unit (not shown) is disposed below the polarizing plate 61. The liquid crystal device 100 has the above-mentioned configuration.

Figure 2:
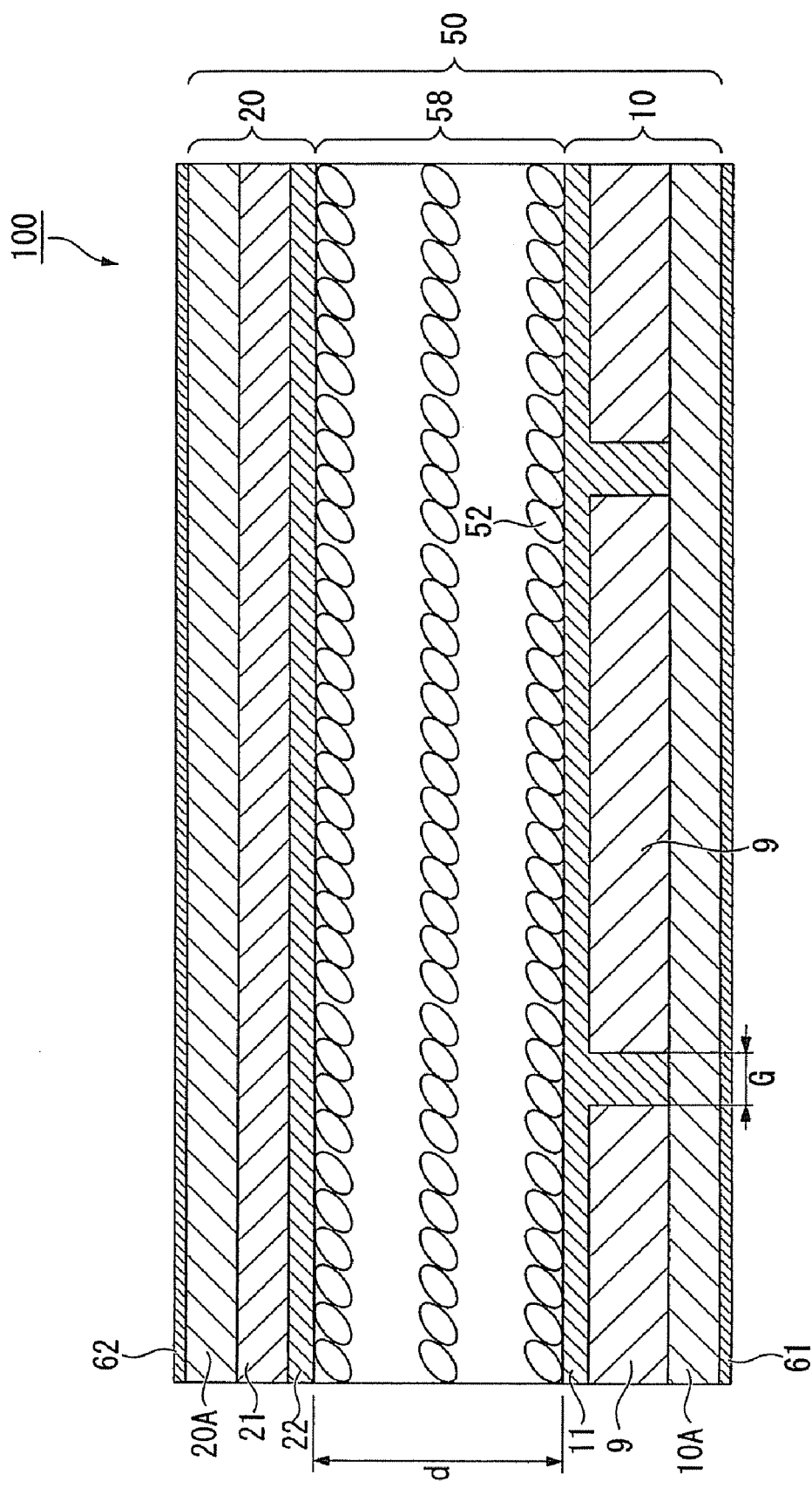
FIG. 2 is a sectional view schematically showing an alignment state of the liquid crystal molecules at the time when applying a voltage.

In the liquid crystal layer 58 of the liquid crystal device 100, the liquid crystal molecules 52 are aligned vertically to the surfaces of the substrates by the first alignment layer 22 provided on the counter substrate 20 and the second alignment layer 11 provided on the circuit substrate 10 when applying no voltage (see FIG. 1). Also, when applying a voltage between the common electrode 21 and pixel electrodes 9, the liquid crystal molecules 52 are tilted approximately in parallel with the surfaces of the substrates (see FIG. 2).

Next, the relation between a pretilt angle and a disclination will be described.

Figure 3:
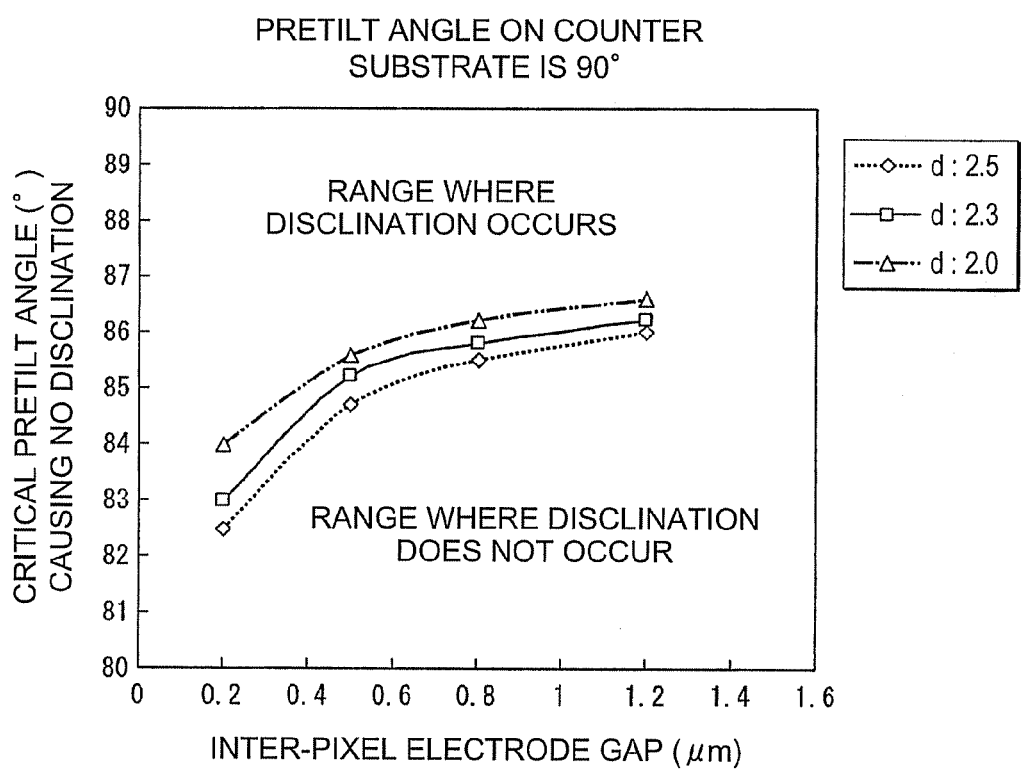
FIG. 3 is a graph showing the occurrence situation of a disclination with respect to a pretilt angle.

FIG. 3 is a graph showing the occurrence situation of a disclination with respect to the inter-pixel electrode gap G and a cell gap d (d1: 2.0 μm, d2: 2.3 μm, d3: 2.5 μm). In this case, assuming that the angle between liquid crystal molecules and the counter substrate 20 is limited to approximately 90°, which does not hvae pretilt, the pretilt angle on the circuit substrate 10 was gradually changed. During that time, the relation between the pretilt angle and whether a disclination occurs was examined.

In FIG. 3, a critical pretilt angle that does not cause a disclination when applying a voltage is plotted for each configuration. From FIG. 3, it is understood that the inter-pixel electrode gap G and critical pretilt angle are approximately proportionate to each other regardless of what the cell gap d is, that is, the critical pretilt angle becomes larger as the inter-pixel electrode gap G is increased. Also, it is understood that if inter-pixel electrode gap G is constant, the critical pretilt angle becomes larger as the cell gap d is increased.

Table 1 is obtained by tabulating a graph shown in FIG. 3.

TABLE 1

Relation between Inter-Pixel Electrode Gap and Cell Gap and Pretilt Angle
Critical pretilt angle

| | | Inter-pixel electrode gap G | | | |
|---|---|---|---|---|---|
| | | 0.2 μm | 0.5 μm | 0.8 μm | 1.2 μm |
| Cell gap d | 2.5 μm | 84° | 85.5° | 86.2° | 86.5° |
| | 2.3 μm | 83° | 85.2° | 85.8° | 86.2° |
| | 2.0 μm | 82.5° | 84.8° | 85.5° | 86.0° |

As shown in FIG. 3 and Table 1, if the inter-pixel electrode gap G is 0.2 μm and cell gap d is 2.5 μm, the critical pretilt angle becomes 82.5°. This value is smaller than the values of the critical pretilt angle in cases where the inter-pixel electrode gap G is the same and the cell gap d is the other values. If the pretilt angle of the liquid crystal molecules 52 becomes less than 82.5°, it turned out that light leakage occurs when applying no voltage so that the contrast is reduced.

On the other hand, if the inter-pixel electrode gap G is 1.2 μm and cell gap d is 2.0 μm, the critical pretilt angle becomes 86.5°. This value is larger than the values of the critical pretilt angle in cases where the inter-pixel electrode gap G is the same and the cell gap d is the other values. If the pretilt angle of the liquid crystal molecules 52 is more than 86.5°, it turned out that the alignment direction cannot be controlled when applying a voltage and thus the alignment is affected by a influence of lateral electric field so that the liquid crystal molecules 52 conflict each other thereby causing a disclination.

From the above-mentioned results, it is understood that if the pretilt angle of the liquid crystal molecules 52 generated by the second alignment layer 11 on the circuit substrate 10 is in the range of 81.0° to 86.5°, no disclination occurs so that a high-contrast characteristic is maintained. Therefore, it is preferable to form the second alignment layer 11 in such a manner that the pretilt angle of the liquid crystal molecules 52 on the circuit substrate 10 is in the range of 81.0° to 86.5°, in accordance with the configuration of each liquid crystal panel.

The liquid crystal device 100 is a liquid crystal device where the liquid crystal molecules in the display area are vertically aligned. Specifically, the liquid crystal molecules 52 on the counter substrate 20 is aligned vertically to the substrate surface by the first alignment layer 22 obtained using a coating process such as spin-coating or flexography. Also, the pretilt angle and azimuth angle on the circuit substrate 10 requiring strong alignment control force is generated by the second alignment layer 11 obtained using a vacuum deposition process such as oblique evaporation or sputtering. Thus, the liquid crystal device 100 that shows vertical alignment as initial alignment is obtained. In this embodiment, the pretilt angle on the circuit substrate 10 is in the range of 81.0° to 86.5°; therefore, the high display-quality liquid crystal device 100 that does not reduce the contrast more than necessary and causes no disclination when applying a voltage is obtained.

Also, since the first alignment layer 22 (vertical alignment layer) is manufactured on the counter substrate 20 using a coating process, the number of expensive vacuum deposition system is not needed. Accordingly, an alignment layer is manufactured with a high production efficiency using a typical alignment layer coating apparatus without having to make a large capital investment. As a result, a vertical-alignment light valve with high display quality is provided at low cost.

Example 1

Pretilt was generated on the circuit substrate 10 by the second alignment layer 11 manufactured using a known method such as oblique evaporation. In this example, a substrate was set in such a manner that the substrate is tilted with respect to an evaporation source by a certain angle θ and then SiO$_2$ was evaporated onto the substrate. The second alignment layer 11 has a function (pretilt) of aligning the liquid crystal molecules 52 at an angle of 82.0° with respect to the substrate surface.

As for the counter substrate 20, an organic PI material was applied to a surface of the common electrode 21 using a method such as spin-coating or flexography so that the first alignment layer 22 is manufactured. The first alignment layer 22 is intended to align the liquid crystal molecules 52 at an angle of approximately 90° with respect to the substrate surface.

The circuit substrate 10 and counter substrate 20 manufactured as described above were combined together via a sealant, a negative liquid crystal material was injected into the gap between these substrates, and the injection inlet was sealed. In this way, a liquid crystal panel was manufactured (the azimuth angle of this liquid crystal panel is set to 0°). Then, the polarizing plates 61 and 62 were attached to both sides of the liquid crystal panel in such a manner that the transmission axes of the polarizing plates 61 and 62 form angles of 45° and 135°, respectively, with the set azimuth angle of the liquid crystal panel, that is, 0°. Thus, the liquid crystal device was completed.

Electric signal were applied into this liquid crystal device so that a selected voltage (voltage ON) and a non-selected voltage (voltage OFF) are applied to the pixel electrode 9. When applying the selected voltage, uniform, bright, white display was obtained in each pixel. Also, when applying the non-selected voltage, black display having less light leakage based on vertical alignment was obtained.

Electronic Apparatuses

Examples of an electronic apparatus including the liquid crystal device according to the above-mentioned embodiment will be described.

Figure 4A:
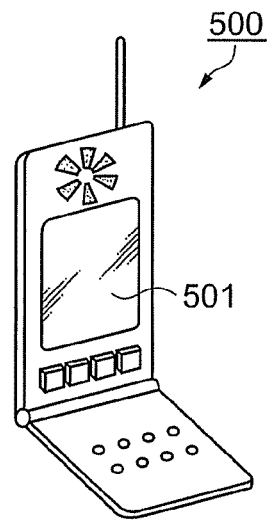
FIG. 4A to 4C are perspective views showing some examples of an electronic apparatus according to the invention.

FIG. 4A is a perspective view showing an example of a cell phone. In FIG. 4A, a cell phone includes a cell phone body 500 and a liquid crystal display 501 using the liquid crystal device according to the above-mentioned embodiment.

Figure 4B:
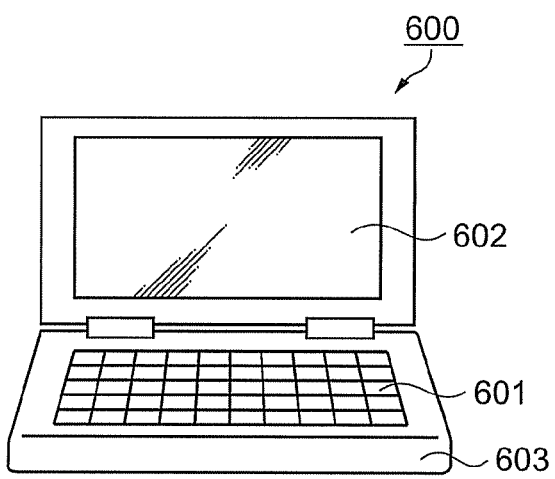

FIG. 4B is a perspective view showing an example of a portable information processing apparatus such as a word processor or a personal computer. In FIG. 4B, an information processing apparatus 600 includes an input unit 601 such as a keyboard, an information processing apparatus body 603, and a liquid crystal display 602 using the liquid crystal device according to the above-mentioned embodiment.

Figure 4C:
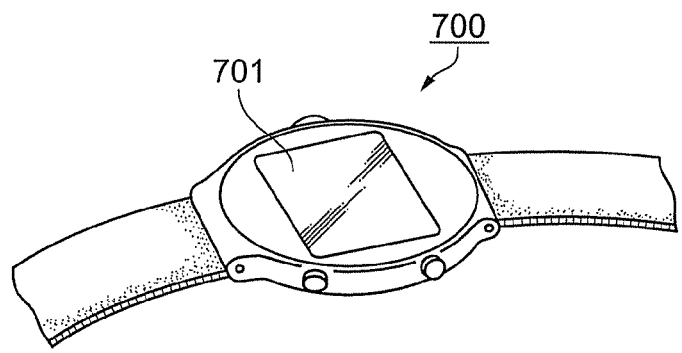

FIG. 4C is a perspective view showing an example of a wristwatch-shaped electronic apparatus. In FIG. 4C, a wristwatch-shaped electronic apparatus includes a wristwatch body 700 and a liquid crystal display 701 using the liquid crystal device according to the above-mentioned embodiment.

As is understood from the above description, the electronic apparatuses shown in FIGS. 4A to 4C are electronic apparatuses where the liquid crystal device according to the above-mentioned embodiment is used as a display. Accordingly, the displays of these electronic apparatuses are allowed to maintain high-contrast, high-quality display over a long term, for example, without causing a problem that when a rubbing process is performed, a rubbing streak appears.

While the embodiment of the invention has been described with reference to the accompanying drawings, the invention is not limited thereto. The above-mentioned embodiment and above-mentioned examples may be combined. It will be apparent for those skilled in the art that various changes and modifications can be made to the embodiment within the technical idea as set forth in the appended claims and that the changes and modifications also fall within the technical scope of the invention.

For example, a coating process is not limited to the above-mentioned methods and other various methods can be used. Dipping (dip-coating), spray-coating, various types of printing, inkjet, and the like are favorably used.

What is claimed is:

1. A liquid crystal device comprising:

a circuit substrate;

a counter substrate disposed so as to be opposed to the circuit substrate;

a liquid crystal layer sandwiched between the circuit substrate and the counter substrate, the liquid crystal layer showing vertical alignment as an initial alignment state;

a first alignment layer formed on a surface of the counter substrate using a coating process, the surface facing the liquid crystal layer, the first alignment layer having a vertical alignment function without generating a pretilt with respect to a line normal to the surface of the counter substrate; and a second alignment layer manufactured on a surface of the circuit substrate using a vacuum deposition process, the surface facing the liquid crystal layer, the second alignment layer generating a pretilt with respect to the surface of the circuit substrate, where the first alignment layer is formed of:

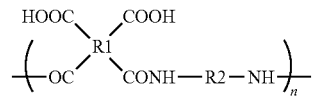

wherein R1 is a quadrivalent organic group and R2 is a divalent organic group.

2. The liquid crystal device according to claim 1, wherein a pretilt angle with respect to the surface of the circuit substrate generated by the second alignment layer is in the range of 81.0° to 86.5°.

3. An electronic apparatus comprising the liquid crystal device according to claim 1.

* * * * *